(12) United States Patent
Ouyang et al.

(10) Patent No.: US 10,804,781 B2
(45) Date of Patent: Oct. 13, 2020

(54) ELECTRICAL MACHINES AND METHODS FOR MANUFACTURING ELECTRICAL MACHINES

(71) Applicant: ABB Schweiz AG, Baden (CH)

(72) Inventors: Wen Ouyang, Cary, NC (US); Colin Tschida, Durham, NC (US)

(73) Assignee: ABB Schweiz AG, Baden (CH)

( * ) Notice: Subject to any disclaimer, the term of this patent is extended or adjusted under 35 U.S.C. 154(b) by 53 days.

(21) Appl. No.: 16/231,098

(22) Filed: Dec. 21, 2018

(65) Prior Publication Data
US 2019/0238034 A1 Aug. 1, 2019

Related U.S. Application Data

(60) Provisional application No. 62/612,406, filed on Dec. 30, 2017.

(51) Int. Cl.
*H02K 17/16* (2006.01)
*H02K 15/00* (2006.01)

(52) U.S. Cl.
CPC ....... *H02K 17/165* (2013.01); *H02K 15/0012* (2013.01)

(58) Field of Classification Search
CPC ...... H02K 17/16; H02K 17/165; H02K 17/18; H02K 17/185; H02K 15/0012
USPC ................................................. 310/211, 212
See application file for complete search history.

(56) References Cited

U.S. PATENT DOCUMENTS

| 4,249,098 A | 2/1981 | Karlen et al. |
| 7,504,756 B2 | 3/2009 | Caprio et al. |
| 8,466,597 B2 | 6/2013 | Yabe et al. |
| 9,219,399 B2 | 12/2015 | Kleber et al. |
| 9,281,732 B2 | 3/2016 | Oshida |
| 9,397,539 B2 | 7/2016 | Kleber et al. |
| 2007/0075603 A1* | 4/2007 | Whiddon ........... H02K 15/0012 310/211 |
| 2012/0126656 A1* | 5/2012 | Gerard ............... H02K 15/0012 310/211 |
| 2014/0132105 A1* | 5/2014 | Kleber ............... H02K 15/0012 310/211 |

(Continued)

FOREIGN PATENT DOCUMENTS

JP 2000014105 A * 1/2000

OTHER PUBLICATIONS

Machine Translation, AIGA, JP-2000014105-A, Jan. 2000. (Year: 2000).*

*Primary Examiner* — Thomas Truong
(74) *Attorney, Agent, or Firm* — Taft Stettinius & Hollister LLP; J. Bruce Schelkopf

(57) ABSTRACT

An electrical machine includes a stator and a rotor in magnetic communication with the stator. The rotor has a cage construction, the rotor having a plurality of passages extending therethrough from a first end of the rotor to a second end of the rotor. A rotor cage has two end rings, one of the end rings disposed at each of the first end and the second end of the rotor, and having a plurality of conductor bars extending through the rotor from the first end to the second end and coupled with the end rings. The conductor bars each include a transition region adjacent to each end ring, and a central region disposed between the two transition regions. Each transition region includes at least one conductor bar dimension that increases proximate the end rings.

20 Claims, 4 Drawing Sheets

(56) References Cited

U.S. PATENT DOCUMENTS

2015/0222164 A1\* 8/2015 Hippen ................ H02K 17/165
　　　　　　　　　　　　　　　　　　310/211

\* cited by examiner

ELECTRICAL MACHINES AND METHODS FOR MANUFACTURING ELECTRICAL MACHINES

TECHNICAL FIELD

The present application generally relates to electrical machines and more particularly, but not exclusively, to electrical machines and methods for manufacturing electrical machines.

BACKGROUND

Electrical machines and methods for manufacturing electrical machines of various types remain an area of interest. Some existing systems have various shortcomings, drawbacks and disadvantages relative to certain applications. For example, in some electrical machines, high speed operation may cause premature failure of rotor end rings. Accordingly, there remains a need for further contributions in this area of technology.

SUMMARY

One embodiment of the present invention is a unique electrical machine. Another embodiment is unique method for manufacturing an electrical machine. Other embodiments include apparatuses, systems, devices, hardware, methods, and combinations for electrical machines. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
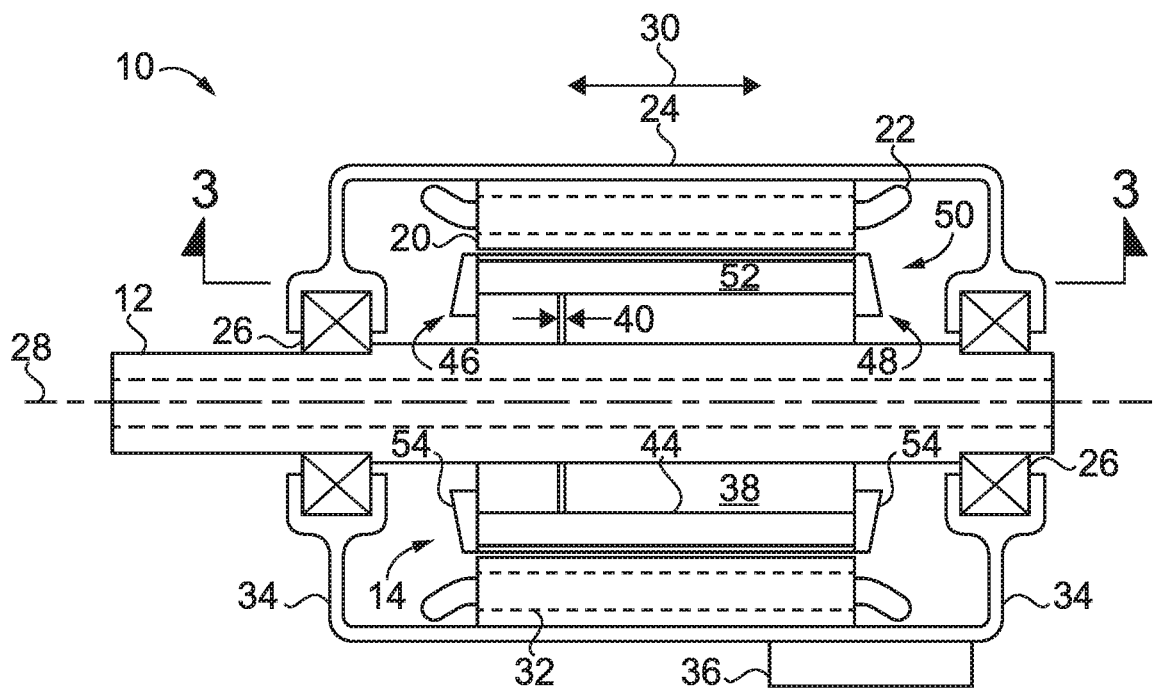
FIG. 1 schematically depicts some aspects of a non-limiting example of an electrical machine in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to the drawings, and in particular FIG. 1, some aspects of a non-limiting example of an electrical machine 10 in accordance with an embodiment of the present invention are schematically depicted. In one form, electrical machine 10 is a 3-phase machine. In other embodiments, electrical machine 10 may be a single-phase machine, or may have any number of phases. In one form, electrical machine 10 is an induction machine. In other embodiments, electrical machine 10 may be a motor and/or a generator, and may be any type of motor, generator or motor/generator. In various embodiments, electrical machine 10 may be a radial flux machine, an axial flux machine or a machine having a three-dimensional (3D) flux path. Electrical machine 10 includes a shaft 12, a rotor 14, a stator 20 having stator windings 22, a housing 24 and bearings 26. Shaft 12 and rotor 14 rotate about an axis of rotation 28, which defines an axial direction 30.

Shaft 12 is constructed to support rotor 14 and react radial and axial or thrust loads from rotor 14. In one form, shaft 12 is operative to transmit mechanical power from electrical machine 10 as an output of electrical machine 10. In other embodiments, shaft 12 may be operative to transmit mechanical power to and/or from electrical machine 10. Shaft 12 is axially and radially positioned by bearings 26. Shaft 12 and bearings 26 define axis of rotation 28 and corresponding axial direction 30.

Rotor 14 and stator 20 are in magnetic communication with each other. Each of rotor 14 and stator 20 have a construction that is operative to direct magnetic flux toward and from each other. In some embodiments, rotor 14 may include other operative sources of magnetic flux, e.g., permanent magnets, windings or both, in conjunction the rotor cage of rotor 14

Stator windings 22 are disposed within passages 32 in stator 20. Stator windings 22 may be distributed in composition. In one form, stator windings 22 are copper conductors. In other embodiments, aluminum and/or other conductor materials may be employed in addition to or in place of copper. In one form, passages 32 are linear, and extend through the length of stator 20 in axial direction 30. In other embodiments, passages 32 may be skewed, may be radial passages or may be passages having a centerline that extends in any two or more of axial, radial and circumferential directions through all or part of stator 20. In some embodiments, stator 20 may include other passages in addition to passages 32, e.g., cooling passages or other passages. In some embodiments, passages 32 may be also constructed to allow a flow of a cooling medium therethrough.

In one form, bearings 26 are mounted in and supported by end plates 34 of housing 24. In some embodiments, one or both end plates 34 may be integral with housing 24. In some embodiments, bearings 26 may be mounted and coupled to housing 24 via one or more other structures and/or integral features of housing 24. Bearings 26 are constructed to react shaft 12 and rotor 14 axial or thrust loads in axial direction 30, and to react shaft 12 and rotor 14 radial loads perpendicular to axis of rotation 28. Housing 24 is constructed to enclose stator 20 and react loads associated with stator 20, e.g., loads generated due to magnetic interaction between stator 20 and rotor 14. Electrical machine 10 includes a drive 36 operative to control current flow through stator windings 22. In one form, drive 36 is mounted on housing 24. In other embodiments, drive 36 may be remotely located.

Figure 2:
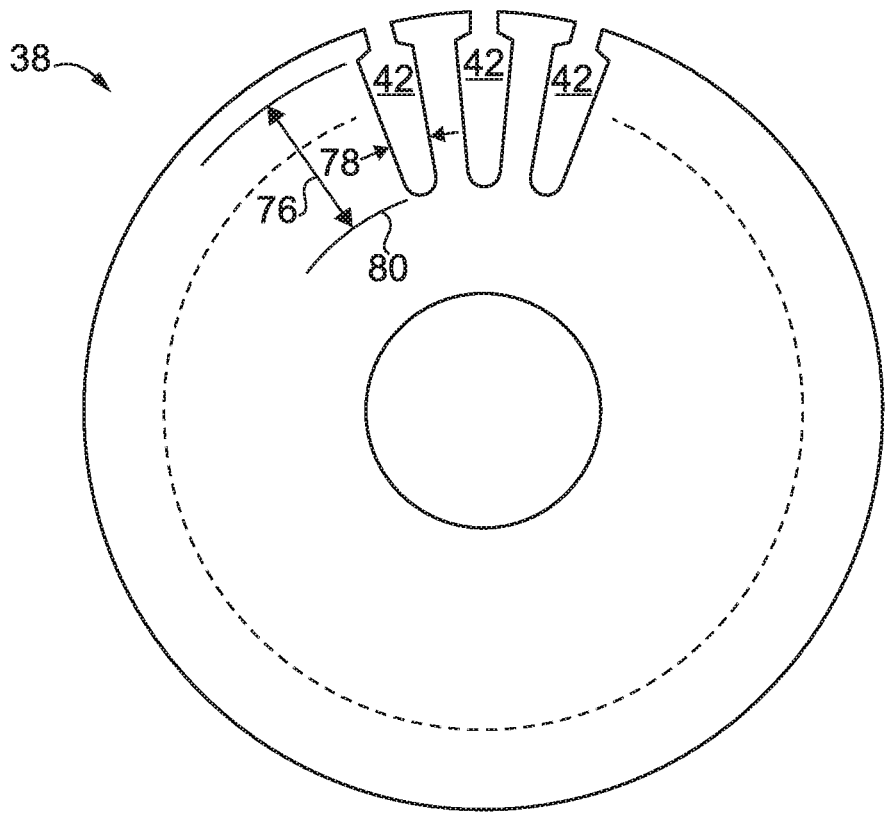
FIG. 2 illustrates some aspects of a non-limiting example of a rotor lamination in accordance with an embodiment of the present invention.

Referring also to FIG. 2, rotor 14 is formed of a plurality of laminations 38 stacked together in axial direction 30. Each lamination 38 has a thickness 40 in axial direction 30. Each lamination includes a plurality of slots or openings 42 therein disposed about the periphery of the lamination and spaced apart from each other circumferentially. Laminations 38 are stacked together in such a manner that openings 42 are aligned to form a plurality of passages 44 extending through rotor 14 one end 46 of rotor 14 to the opposite end 48 of rotor 14.

Rotor 14 has a cage construction, and includes rotor cage 50. Rotor cage 50 includes a plurality of rotor bus bars or rotor conductor bars 52 and two shorting end rings 54. One end ring 54 is disposed at end 46 of rotor 14, and the other end ring 54 is disposed at end 48 of rotor 14. Conductor bars 52 extend through passages 44 in rotor 14 from end 46 to end 48 and are coupled with end rings 54 at both ends of conductor bars 52. For example, rotor cage 50 may be formed as a casting, e.g., wherein the stacked laminations 38 of rotor 14 are placed into a mold, and a molten material is poured into the mold, and flows through and fills passages 44 and fills cavities forming end rings 54, thus forming conductor bars 52 and end rings 54 simultaneously as a single, integral unitary structure. In other embodiments, end rings 54 may be brazed or otherwise joined to conductor bars 52. In one form, conductor bars 52 are parallel to each other. In one form, conductor bars 52 are skewed, e.g., relative to axis of rotation 28. In other embodiments, conductor bars 52 may be parallel to axis of rotation 28. In one form, conductor bars 52 and end rings 54 are formed from copper. In other embodiments, conductor bars 52 and/or end rings 54 may be formed from aluminum in addition to or in place of copper. In still other embodiments, other materials may be used to form conductor bars 52 and end rings 54. With embodiments having cast conductor bars 52, the size of the slots or openings 42 and the passages 44 at any given location dictates or controls the size of the conductor bar the same location.

For high speed operation, e.g., over 10,000 rpm, induction machine end rings may be a relatively weak component in the rotor because, for example, they are cantilevered from axial ends of the rotor. An enlarged conductor bar cross-section, e.g., at locations adjacent to the end rings, may provide stress relief both from the bar-ring joints and end ring with minimum impact on the machine electromagnetic performance. The enlarged conductor bar cross section may be a transition region between a central region of the conductor bar and the end rings.

Some embodiments thus provide stress relief on the connection between rotor end ring and rotor conductor bars. The lamination layers on each end of the rotor may be designed with increased rotor conductor bar slot dimensions in specific regions to accommodate the conductor bar transition regions and achieve better adapted joints between the rotor conductor bar end sections and the end rings, by which the stress between bars and rings can be effectively reduced with minimum or negligible or no impact on the electrical machine electro-magnetic performance. Moreover, the end rings can be designed with tapered or profiled axial thickness with a reduced inner diameter to further improve the ring robustness of the rotor structure.

In some embodiments, the bar-end ring joints design disclosed herein effectively reduces the stress of the rotor cage end section, especially to the bottom region of the bar-end joint (e.g., closer to the shaft), which also has minimum impact on the induction motor electro-magnetic performance with the air gap region design maintained. In some embodiments, the end rings may be designed with smaller inner diameters to adapt to the conductor bar size at end section. In some embodiments, the smaller end ring inner diameter may provide stronger support for the full end ring structure and thus reduce the end ring stress effectively, which may further help the containment of the end ring with less interface stress due to the different expansion rate compared to the slot-contained bars. Some embodiments may mitigate the need for a retaining ring for the end-ring and may simplify manufacturing. In some embodiments, the end ring section may be designed with a tapered profile with increased radial thickness to provide enhanced mechanical strength to keep the end ring in position with minimized deformation during high speed operation.

In some embodiments, the inventive rotor cage may provide a higher stress margin than conventional designs, providing a robust rotor cage joint structure for higher speed operation, e.g., with the same or substantially the same casting process. In some embodiments, the conductor bar transition region may be formed by a modification of the slot or opening dimensions in laminations proximate to the end rings. A portion, e.g., in some embodiments, a small portion, of the end laminations (e.g., one or a few or several or tens or more, depending upon the embodiment) in each rotor end may be modified to enhance rotor strength, while having a minimal or insubstantial impact on the rotor performance if the modifications are made to the radially inner region of the rotor slot design, instead of the slot region close to the air gap between the rotor and the stator.

Some embodiments employ laminations with different thickness and sheet number to create a modified bar-ring join region (i.e., the conductor bar transition region) for stress relief. Some embodiments may include an enhanced end ring design with smaller inner diameter regions to accommodate the end lamination adjustment. In some embodiments, the end ring may be designed with a smaller inner diameter to provide extra mechanical support to minimize the relative deformation between conductor bar and end ring under high speed operation. In some embodiments, the end ring profile may be tapered to further increase the end ring structure stiffness with cooling needs. The end ring copper loss can be compensated by the ring thickness and longer radial length.

Figure 3:
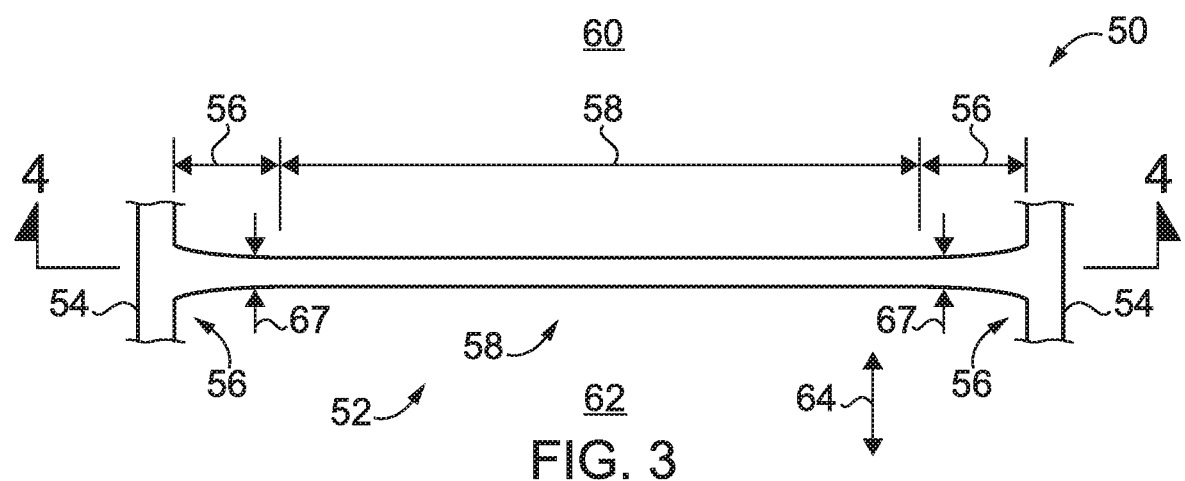
FIG. 3 illustrates a cross-sectional view depicting some aspects of a rotor cage with conductor bar and end rings in accordance with an embodiment of the present invention.
Figure 4:
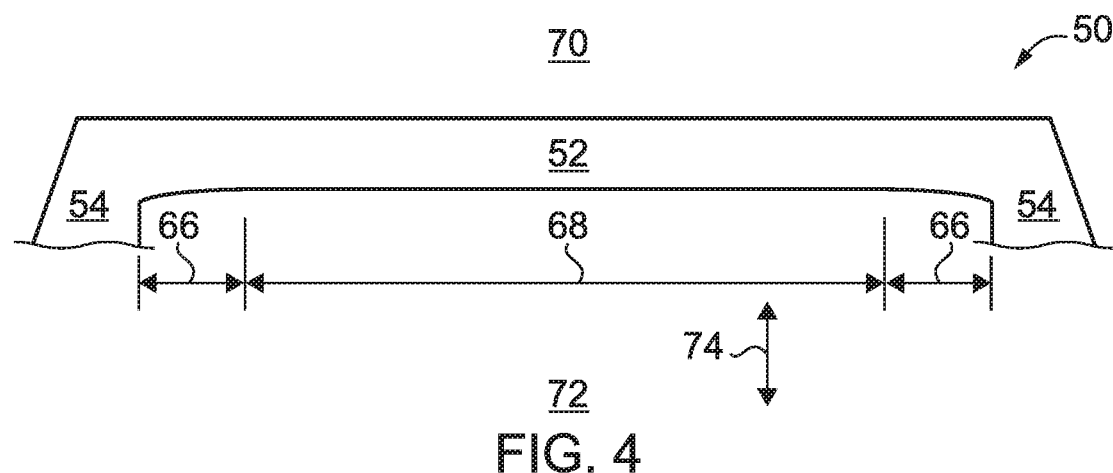
FIG. 4 illustrates a cross-sectional view depicting some aspects of a rotor cage with conductor bar and end rings in accordance with an embodiment of the present invention.

Referring also to FIGS. 3 and 4, some aspects of a cross-section of rotor cage 50 illustrating a conductor bar 52 and end rings 54 is schematically illustrated in accordance with an embodiment of the present invention. Seen in FIG. 3 is that each conductor bar 52 includes conductor bar transition regions 56 adjacent to each end ring 54 and a central region 58 disposed between transition regions 56. Transition regions 56 are disposed on both sides 60 and 62 of each conductor bar 52, e.g., in a rotational or circumferential direction 64. Transition regions 56 provide a transition from the circumferential thickness of conductor bars 52 at central region 58 to a greater thickness at the intersection or junction with end rings 54, thus increasing surface area at the intersection between conductor bars 52 and end rings 54, and thereby reducing stresses at the location where conductor bars 52 meet end rings 54, e.g., reducing shear stresses.

Seen in FIG. 4 is that each conductor bar 52 includes conductor bar transition regions 66 adjacent to each end ring 54 and a central region 68 disposed between transition regions 66. Transition regions 66 are disposed on the radially inner side 70 of conductor bar 52, but not on the radially outer side 72 of conductor bar 52, and increase the radial height of conductor bars 52 with increasing proximity to end rings 54. Other embodiments may also include a transition region 66 on the radially outer side of conductor bar 52. In various embodiments, transition regions 66 and central region 68 may or may not have axial locations that coincide with axial locations of transition regions 56 and central region 58, e.g., depending on the embodiment. Transition regions 66 provide a transition from the radial height or thickness in a radial direction 74 of conductor bars 52 in central portion 68 to a greater height or thickness at the intersection with end rings 54, thus increasing surface area at the intersection between conductor bars 52 and end rings 54, and thereby reducing stress, e.g., shear stress, at the location where conductor bar 52 meets end rings 54.

Transition regions 56 and 66 each include a conductor bar 52 dimension that increases proximate to end rings 54. More particularly, in some embodiments, transition regions 56 and 66 each include a dimension that increases with increasing proximity to end rings 54, i.e., wherein the dimension continues to increase as the proximity to end rings 54 increases, i.e., increases in proportion or relation to the proximity to end rings 54. For example, the circumferential extent of conductor bars 52 in both circumferential directions (e.g., both up and down in the plane of view of FIG. 3), hence the circumferential thickness 67 of conductor bars 52, increases in proportion or relation to the proximity to end rings 54. Also, the height or thickness in radial direction 74 (e.g., where the thickness increase occurs on the radially inner side 72) increases in proportion or relation to the proximity to end rings 54. Similarly, passages 44 have dimensions that increase proximate to end 46 of rotor 14 and proximate to end 48 of rotor 14 (or proximate to end rings 54), and in some embodiments, passages 44 have dimensions that increase with increasing proximity to ends to end 46, 48 of rotor 14 (or end rings 54). For example, slots or openings 42, which form passages 44, have dimensions, e.g., radial height 76 (e.g., see FIG. 2) and circumferential thickness 78 (FIG. 2) that increase in size with increasing proximity to ends 46, 48 of rotor 14 (or end rings 54) to form or accommodate the transition regions 56, 66 of conductor bars 52. The increase in radial height is the result of moving the bottom 80 of the slot radially inward with increasing proximity to ends 46, 48 (or end rings 54). The circumferential thickness increase may occur over only a portion of the radial height 76 of conductor bars 52, e.g., as in the illustrated embodiments, or in other embodiments may occur over the entire radial height 76 of conductor bars 52.

Figure 5:
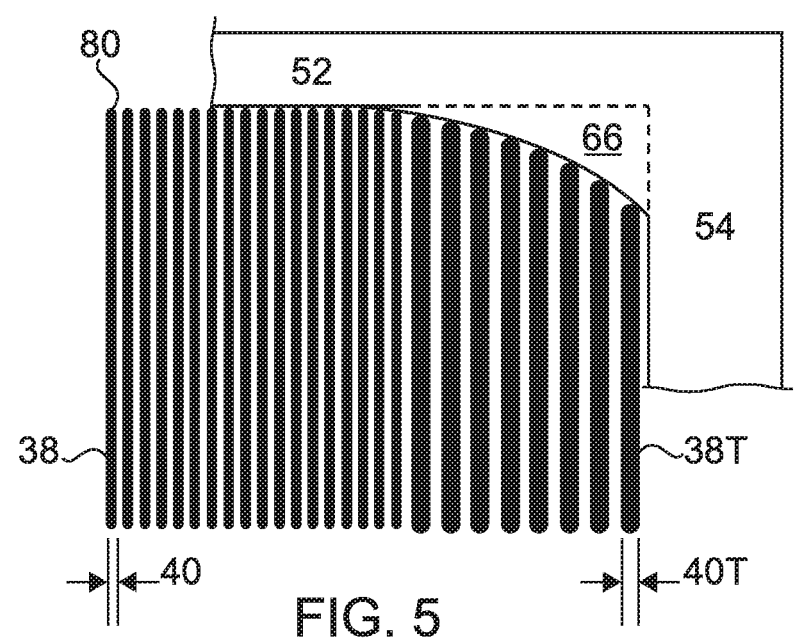
FIG. 5 illustrates some aspects of a non-limiting example of laminations that vary in thickness and slot bottom dimension in order to provide a transition region of a conductor bar of a rotor cage in accordance with an embodiment of the present invention.

Referring also to FIG. 5, a number of laminations in proximity to end rings 54 may have slot bottoms 80 successively lowered to increase the radial height 76 of passages 44 with increasing proximity to end rings 54. In addition, the thickness 40 of the laminations may also be increased proximate to ends 46, 48 (or end rings 54), which are illustrated as laminations 38T having a thickness 40T, which are thicker than laminations 38 having a thickness 40. The number of laminations used to form the transition regions 56, 66 may vary with the needs of the application. In some embodiments, a single lamination may have modified slot dimensions and/or lamination thickness. In other embodiments, a few laminations may be so modified, and in yet other embodiments, several laminations may be so modified, while in still other embodiments tens of laminations may be so modified. In some embodiments, most or all of the length of conductor bars 54 may be increased in circumferential thickness and/or radial height.

Figure 6A:
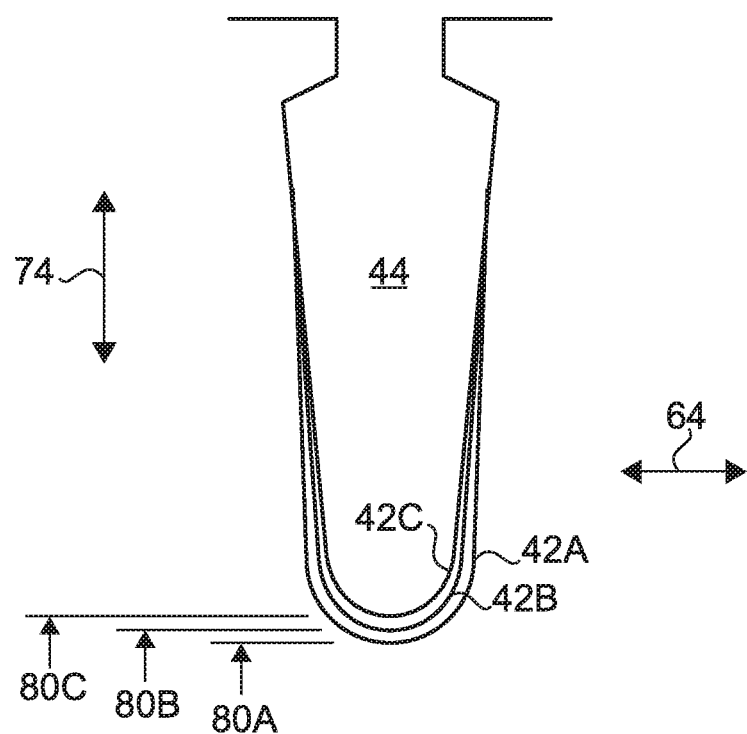
FIGS. 6A and 6B illustrate some aspects of non-limiting examples of end views looking into rotor passages depicting transition regions in accordance with embodiments of the present invention.
Figure 6B:
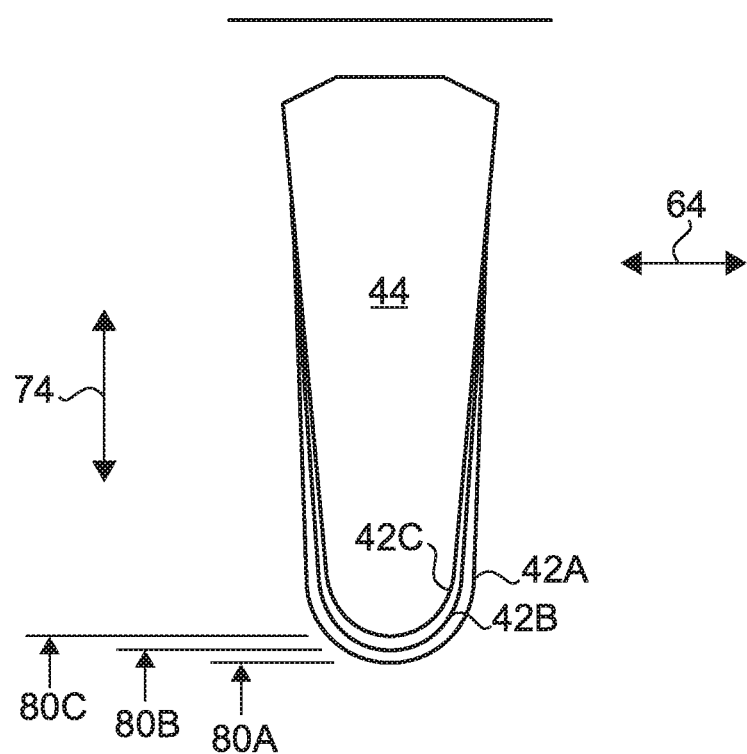

Referring also to FIGS. 6A and 6B, some aspects of non-limiting examples of end views looking into rotor passages 44 depicting transition regions in the passages 44 for forming transition regions 56, 66 conductor bars in accordance with embodiments of the present invention. FIG. 6A illustrates an open slot configuration, whereas FIG. 6B illustrates a bridge configuration, wherein openings 42 and passage 44 are not open at the outer diameter of rotor 14, and hence conductor bars 52 are not visible on the outer diameter of rotor 14. Slot or opening 42A is in the lamination closest to end ring 54; slot or opening 42B is in the lamination second closest to end ring 54; and slot or opening 42C is in the lamination third closest to end ring 54. It is seen that passage 44 formed by the slots or openings 42A, 42B and 42C have bottoms 80A, 80B and 80C that move radially inward with increasing proximity to end ring 54, and thus, the radial height 76 of conductor bar 52 increases with increasing proximity to end ring 54. Similarly, it is seen in FIGS. 6A and 6B that the width of approximately the lower ⅔ of passage 44 increases with increasing proximity to end ring 54, and hence, the thickness of the lower ⅔ of conductor bars 52 increases in circumferential thickness 67 (e.g., corresponding to circumferential thickness 78 or width 78 of slots or openings 42) with increasing proximity to end ring 54.

Figure 7A:
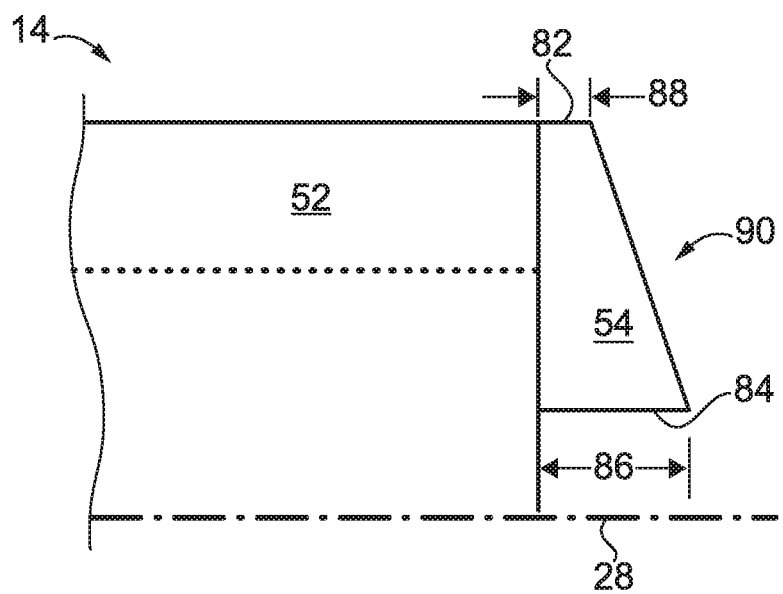
FIGS. 7A and 7B illustrate some aspects of non-limiting examples of end rings in accordance with embodiments of the present invention. In the embodiment of FIG. 7A, the end ring includes a transition region that extends along 100% of the radial height of the end ring, whereas in the embodiment FIG. 7B, the end ring transition region extends along 80% of the radial height of the end ring.
Figure 7B:
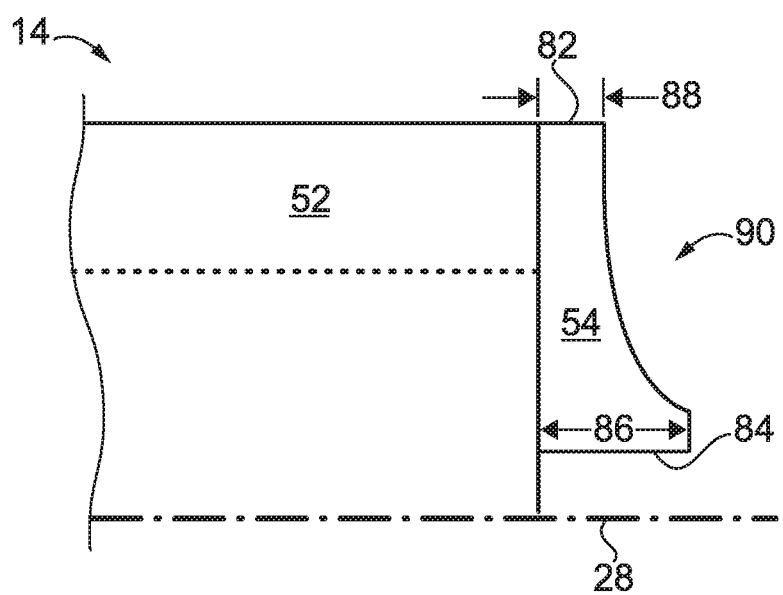

Referring also to FIGS. 7A and 7B, some aspects of non-limiting examples of end rings 54 are illustrated in accordance with embodiments of the present invention. End rings 54 have an outer diameter 82, and an inner diameter 84. In some embodiments, end rings 54 may be designed further close to shaft 12, with a profile shape to provide better stress relief from the inner region of the ring, e.g., as illustrated in FIGS. 7A and 7B. End rings 54 thus have an increased radial height relative to conventional end rings, defined by inner diameter 86 being significantly smaller than with conventional end rings. The radial height of end ring 54 may be substantially greater than the radial height of conductor bars 52. In some embodiments the radial height of end ring 54 may be 1.5 or more time the radial height of conductor bars 52. In other embodiments, the radial height of end ring 54 may be two or more times the radial height of conductor bars 52.

End rings 54 have an axial thickness 86 at the inner diameter 84 of end rings 54, an axial thickness 88 at outer diameter 82 of end ring 54. Each end ring 54 includes an end ring transition region 90 for transitioning from the highest axial thickness portion of end ring 54 to the lowest axial thickness portion of end ring 54. In the end ring transition region 90, the axial thickness of end ring 54 smoothly transitions from axial thickness 86 to axial thickness 88. In some embodiments, end ring transition region 90 extends over a substantial portion of the radial height of end ring 54. In some embodiments, transition region 90 may have a profile configured to spin cooling media into electrical machine 10, e.g., into the electrical machine 10 winding region, instead of the air gap region between stator 20 and rotor 14 with the desired speed and direction in some particular embodiments. The increased thickness with longer radial length can also compensate the resistance for less end ring copper loss. In some embodiments, the end ring transition region 90 extends 100% of the radial height of end ring 54, e.g., as in the depiction of FIG. 7A. In other embodiments, the end ring transition region 90 extends over 80% of the radial height of end ring 54, e.g., as in the depiction of FIG. 7B. In some embodiments, end ring transition region 90 extends over 75% of the radial height of end ring 54. In other embodiments, end ring transition region 90 extends over 30-100% of the radial height of end ring 54. In still other embodiments, end ring transition region 90 extends over 50-100% of the radial height of end ring 54. In yet other embodiments, end ring transition region 90 extends over 60-100% of the radial height of end ring 54. In yet still other embodiments, end ring transition region 90 extends over 70-100% of the radial height of end ring 54. In further embodiments, end ring transition region 90 extends over 80-100% of the radial height of end ring 54.

Embodiments of the present invention include an electrical machine, comprising: a stator; a rotor in magnetic communication with the stator, the rotor having a cage construction, the rotor having a plurality of passages extending therethrough from a first end of the rotor to a second end of the rotor; a rotor cage having two end rings, one of the end rings disposed at each of the first end and the second end of the rotor, and having a plurality of conductor bars extending through the rotor from the first end to the second end and coupled with the end rings; wherein the conductor bars each include a transition region adjacent to each end ring, and a central region disposed between the two transition regions; wherein each transition region includes at least one conductor bar dimension that increases proximate to the end rings.

In a refinement, the at least one conductor bar dimension increases with increasing proximity to the end rings.

In another refinement, the conductor bar increases in circumferential thickness with increasing proximity to the end rings.

In yet another refinement, the conductor bar increases in radial height with increasing proximity to the end rings.

In still another refinement, the rotor is formed of plurality of laminations stacked together, each lamination having a plurality of slots; wherein the slots are aligned to form the passages; and wherein the slots increase in size with increasing proximity to the end rings.

In yet still another refinement, the slots increase in circumferential thickness with increasing proximity to the end rings.

In a further refinement, the slots increase in radial height with increasing proximity to the end rings.

In another further refinement, the laminations have a thickness, and wherein the thickness increases proximate to the end rings.

In a yet further refinement, each end ring has an outer diameter and an inner diameter; and wherein the end ring has a first axial thickness at the inner diameter of the end ring, a second axial thickness at the outer diameter of the end ring; and wherein each end ring includes an end ring transition region, wherein the axial thickness of the end ring smoothly transitions from the first axial thickness to the second axial thickness.

In a still further refinement, the end ring transition region extends at least 75% of the radial height of the each end ring.

Embodiments of the present invention include a method for manufacturing an electrical machine, comprising: forming a rotor having a caged construction, the rotor having a plurality of passages extending therethrough from a first end of the rotor to a second end of the rotor; forming a rotor cage having two end rings, one of the end rings disposed at each of the first end and the second end of the rotor, and having a plurality of conductor bars extending through the rotor from the first end to the second end and coupled with the end rings; wherein the conductor bars each include a transition region adjacent to each end ring, and a central region disposed between the two transition regions; wherein each transition region includes at least one conductor bar dimension that increases proximate to the end rings.

In a refinement, the at least one conductor bar dimension increases with increasing proximity to the end rings.

In another refinement, the conductor bar increases in circumferential thickness with increasing proximity to the end ring.

In yet another refinement, the conductor bar increases in radial height with increasing proximity to the end rings.

In still another refinement, the rotor is formed of a stack having plurality of laminations, each lamination having a plurality of slots; wherein the slots are aligned to form the passages; and wherein the slots increase in size with increasing proximity to the end rings.

In yet still another refinement, the slots increase in circumferential thickness with increasing proximity to the end rings.

In a further refinement, the slots increase in radial height with increasing proximity to the end rings.

In a yet further refinement, the laminations have a thickness, and wherein the thickness increases proximate to the end rings.

In a still further refinement, each end ring has an outer diameter and an inner diameter; and wherein the end ring has a first axial thickness at the inner diameter of the end ring, a second axial thickness at the outer diameter of the end ring; and wherein each end ring includes an end ring transition region, wherein the axial thickness of the end ring smoothly transitions from the first axial thickness to the second axial thickness.

In a yet still further refinement, the end ring transition region extends at least 75% of the radial height of the each end ring.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:
1. An electrical machine, comprising:
   a stator;

a rotor in magnetic communication with the stator, the rotor having a cage construction, the rotor having a plurality of passages extending therethrough from a first end of the rotor to a second end of the rotor;

a rotor cage having two end rings, one of the end rings disposed at each of the first end and the second end of the rotor, and having a plurality of conductor bars extending through the rotor from the first end to the second end and coupled with the end rings; wherein the conductor bars each include a transition region adjacent to each end ring, and a central region disposed between the two transition regions, each of the transition regions being axially positioned within a passage of the plurality of passages the rotor between the central region and the adjacent end ring; wherein each transition region includes at least one conductor bar dimension that increases in proportion to the proximity of the transition region to the adjacent end ring.

2. The electrical machine of claim 1, wherein the at least one conductor bar dimension increases with increasing proximity to the adjacent first and second end of the rotor.

3. The electrical machine of claim 2, wherein the conductor bar increases in circumferential thickness with increasing proximity to the end rings.

4. The electrical machine of claim 2, wherein the conductor bar increases in radial height with increasing proximity to the end rings.

5. The electrical machine of claim 2, wherein the rotor is formed of plurality of laminations stacked together, each lamination having a plurality of slots; wherein the slots are aligned to form the passages; and wherein the slots increase in size in proportion to the proximity to the end rings.

6. The electrical machine of claim 5, wherein the slots increase in circumferential thickness with increasing proximity to the end rings.

7. The electrical machine of claim 5, wherein the slots increase in radial height with increasing proximity to the end rings.

8. The electrical machine of claim 5, wherein the laminations have a thickness, and wherein the thickness increases proximate to the end rings.

9. The electrical machine of claim 1, wherein each end ring has an outer diameter and an inner diameter, each end ring and the plurality of conductor bars being a single, unitary structure; and wherein the end ring has a first axial thickness at the inner diameter of the end ring, a second axial thickness at the outer diameter of the end ring; and wherein each end ring includes an end ring transition region, wherein the axial thickness of the end ring smoothly transitions from the first axial thickness to the second axial thickness.

10. The electrical machine of claim 9, wherein the end ring transition region extends at least 75% of the radial height of the each end ring.

11. A method for manufacturing an electrical machine, comprising:

forming a rotor having a caged construction, the rotor having a plurality of passages extending therethrough from a first end of the rotor to a second end of the rotor;

forming a rotor cage having two end rings, one of the end rings disposed at each of the first end and the second end of the rotor, and having a plurality of conductor bars extending through the rotor from the first end to the second end and coupled with the end rings; wherein the conductor bars each include a transition region adjacent to each end ring, and a central region disposed between the two transition regions, the transition regions being axially positioned within the plurality of passages between the central region and the adjacent end ring; wherein each transition region includes at least one conductor bar dimension that increases in proportion to the proximity to the end rings.

12. The method of claim 11, wherein the at least one conductor bar dimension increases both a circumferential thickness and a radial height with increasing proximity to the end rings.

13. The method of claim 11, wherein the conductor bar increases in circumferential thickness with increasing proximity to the end ring.

14. The method of claim 11, wherein the conductor bar increases in radial height with increasing proximity to the end rings.

15. The method of claim 11, wherein the rotor is formed of a stack having plurality of laminations, each lamination having a plurality of slots; wherein the slots are aligned to form the passages; and wherein the slots increase in size with increasing proximity to the end rings.

16. The method of claim 15, wherein the slots increase in circumferential thickness with increasing proximity to the end rings.

17. The method of claim 15, wherein the slots increase in radial height with increasing proximity to the end rings.

18. The method of claim 15, wherein the laminations have a thickness, and wherein the thickness increases proximate to the end rings.

19. The method of claim 11, wherein each end ring has an outer diameter and an inner diameter; and wherein the end ring has a first axial thickness at the inner diameter of the end ring, a second axial thickness at the outer diameter of the end ring; and wherein each end ring includes an end ring transition region, wherein the axial thickness of the end ring smoothly transitions from the first axial thickness to the second axial thickness.

20. The method of claim 19, wherein the end ring transition region extends at least 75% of the radial height of the each end ring.

* * * * *